(12) United States Patent
Yamakawa et al.

(10) Patent No.: US 9,837,888 B2
(45) Date of Patent: Dec. 5, 2017

(54) BOOST CONTROL APPARATUS BASED ON OUTPUT CURRENT CHANGE AMOUNT

(71) Applicant: TOYOTA JIDOSHA KABUSHIKI KAISHA, Toyota-shi, Aichi-ken (JP)

(72) Inventors: Toshifumi Yamakawa, Shizuoka-ken (JP); Masaki Okamura, Toyota (JP); Naoyoshi Takamatsu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/041,260

(22) Filed: Feb. 11, 2016

(65) Prior Publication Data
US 2016/0241133 A1    Aug. 18, 2016

(30) Foreign Application Priority Data
Feb. 13, 2015   (JP) ................ 2015-026652

(51) Int. Cl.
*H02M 1/42*   (2007.01)
*H02M 1/14*   (2006.01)
(Continued)

(52) U.S. Cl.
CPC .............. *H02M 1/42* (2013.01); *H02M 1/14* (2013.01); *H02M 3/158* (2013.01); *H02M 3/1582* (2013.01); *H02M 2001/0003* (2013.01)

(58) Field of Classification Search
CPC .... H02M 3/158; H02M 3/1588; H02M 7/537; H02M 3/1582; H02M 2001/0012;
(Continued)

(56) References Cited

U.S. PATENT DOCUMENTS 8,222,763 B2    7/2012  Mimatsu et al.
8,232,786 B2 *  7/2012  Phadke ............... H02M 1/4225
                                                323/222
(Continued)

FOREIGN PATENT DOCUMENTS

JP    2005-151606 A    6/2005
JP    2006-254593 A    9/2006
(Continued)

OTHER PUBLICATIONS

T-S. Hwang et al., "Seamless Boost Converter Control Under the Critical Boundary Condition for a Fuel Cell Power Conditioning System"; IEEE Transactions on Power Electronics, vol. 27, No. 8, Aug. 2012.
(Continued)

*Primary Examiner* — Gustavo Rosario Benitez
(74) *Attorney, Agent, or Firm* — Andrews Kurth Kenyon LLP

(57) ABSTRACT

A boost control apparatus is provided with a current value change amount detecting device configured to detect a change amount of output current that flows through the reactor in a first predetermined period during one-side element control for driving only one of a first switching element and a second switching element. A determining device is provided that is configured to determine that the output current is near zero if the change amount is less than a predetermined threshold value. A controlling device is also provided that is configured (i) to perform first duty control by a first control parameter if the output current is not near zero, and (ii) to perform second duty control by a second control parameter, which is different from the first control parameter, if the output current is near zero.

7 Claims, 14 Drawing Sheets

(51) Int. Cl.
*H02M 3/158* (2006.01)
*H02M 1/00* (2006.01)

(58) Field of Classification Search
CPC ... H02M 2001/009; H02M 2001/0058; H02M 1/42; H02M 1/14; H02M 2001/0003; B60L 2210/14; B60L 2210/10; B60L 2210/40; B60L 2240/421; B60L 2240/423; B60L 2240/80; B60L 2260/44
See application file for complete search history.

(56) References Cited

U.S. PATENT DOCUMENTS

| | | | |
|---|---|---|---|
| 8,897,043 | B2 | 11/2014 | Usami |
| 2010/0202177 | A1 | 8/2010 | Kajouke et al. |
| 2011/0248663 | A1* | 10/2011 | Yamakawa ............. B60L 11/08 318/805 |
| 2012/0049774 | A1* | 3/2012 | Takamatsu .......... B60L 11/1803 318/400.3 |
| 2012/0087159 | A1 | 4/2012 | Chapman et al. |
| 2012/0281436 | A1 | 11/2012 | Cuk |
| 2013/0258734 | A1 | 10/2013 | Nakano et al. |
| 2013/0311026 | A1* | 11/2013 | Endo ..................... B60L 3/0046 701/22 |
| 2014/0361757 | A1 | 12/2014 | Sunahara |
| 2016/0241162 | A1* | 8/2016 | Yamakawa ........... H02M 3/158 |

FOREIGN PATENT DOCUMENTS

| | | |
|---|---|---|
| JP | 2009-171735 A | 7/2009 |
| JP | 2011-120329 A | 6/2011 |
| JP | 2012-090453 A | 5/2012 |
| JP | 2013-153583 A | 8/2013 |
| JP | WO 2013111821 A1 * | 8/2013 .......... H02M 3/1588 |

OTHER PUBLICATIONS

J. Morroni et al., "Adaptive Tuning of Swithced-Mode Power Supplies Operating in Discontinuous and Continuous Conduction Modes"; IEEE Transactions on Power Electronics, vol. 24, No. 11, Nov. 2009.
Office Action dated Feb. 16, 2017 in U.S. Appl. No. 15/041,415.
USPTO, Office Action in U.S. Appl. No. 15/041,415 dated Jul. 27, 2017, 17 pages.

* cited by examiner

BOOST CONTROL APPARATUS BASED ON OUTPUT CURRENT CHANGE AMOUNT

CROSS-REFERENCE TO RELATED APPLICATIONS

This application is based upon and claims the benefit of priority of the prior Japanese Patent Application No. 2015-026652, filed on Feb. 13, 2015, the entire contents of which are incorporated herein by reference.

BACKGROUND OF THE INVENTION

1. Field of the Invention

Embodiments of the present invention relate to a boost control apparatus mounted, for example, on a vehicle or the like.

2. Description of the Related Art

On an electric vehicle, such as an electric car, a hybrid car, and a fuel cell vehicle, an inverter is mounted in order to control a motor generator that generates driving force used for running and regenerative power used for power storage. Since electric power used by the inverter varies depending on a running state or the like, a voltage conversion apparatus (or a converter) is provided between a power storage apparatus and the inverter in some cases.

In order to improve fuel efficiency of the electric vehicle, it is effective to reduce a loss of the converter. Thus, for example, in Japanese Patent Application Laid Open No. 2011-120329, there is proposed a technology in which a boost converter is switching-driven only by a one-side element (hereinafter referred to as "one-side element control"). According to the one-side element control, it is considered that the loss of the converter can be reduced, for example, due to a reduction in current ripple.

In Japanese Patent Application Laid Open No. 2005-151606, there is proposed a technology related to control of the converter in which a moment at which current that flows through a reactor becomes nearly zero (or zero crossing) is detected.

In the one-side element control, a relation between output current and a duty ratio significantly changes before and after the zero crossing, and it is thus preferable to change control content depending on whether or not it is the zero crossing. In other words, it is preferable to switch between control for a zero-crossing region and control for a non-zero-crossing region, and to perform either one, as occasion demands.

Here, the zero crossing can be determined, for example, by monitoring the current that flows through the reactor and applied voltage or the like; however, it is not easy to detect the zero crossing with high accuracy and without delay in conventional technologies including the aforementioned patent literatures. If the timing of the zero crossing cannot be accurately detected, duty control cannot be appropriately switched, which can result in such a technical problem that desired output current cannot be obtained. In particular, it is considered that such a problem frequently occurs in a high-frequency state.

SUMMARY

In view of the aforementioned problems, it is therefore an object of embodiments of the present invention to provide a boost control apparatus configured to accurately determine the zero crossing in the one-side element control, thereby performing appropriate duty control.

The above object of the present invention can be achieved by a boost control apparatus that can realize one-side element control for driving only one of a first switching element and a second switching element, each of which is connected to a reactor in series. The boost control apparatus includes a current value change amount detecting device configured to detect a change amount of output current that flows through the reactor in a first predetermined period during the one-side element control. The boost control apparatus also includes a determining device configured to determine that the output current is near zero if the change amount is less than a predetermined threshold value. A controlling device is also provided that is configured (i) to perform first duty control by a first control parameter if it is not determined that the output current is near zero, and (ii) to perform second duty control by a second control parameter, which is different from the first control parameter, if it is determined that the output current is near zero, wherein the first control parameter and the second control parameter include feed-forward terms that are different from each other, and a duty ratio corresponding to the output current in the second duty control is set to be greater than a duty ratio in the first duty control due to the difference of the feed-forward terms.

The boost control apparatus according to embodiments of the present invention is, for example, a converter mounted on a vehicle, and is provided with the first switching element and the second switching element, each of which is connected to the reactor in series. The first switching element and the second switching element may be, for example, an insulated gate bipolar transistor (IGBT), a power metal-oxide semiconductor (MOS) transistor, a power bipolar transistor, or the like. For example, a diode is connected to each of the first switching element and the second switching element, in parallel.

In particular, the boost control apparatus according to embodiments of the present invention can realize the one-side element control for driving only one of the first switching element and the second switching element. When the one-side element control is performed, it is determined which switching element, out of the first switching element and the second switching element, is to be driven to perform the one-side element control, for example, on the basis of values of current and voltage to be outputted, or the like. More specifically, for example, if a motor generator connected to the boost control apparatus performs a regenerative operation, the one-side element control by the first switching element is selected. If the motor generator performs a power-running operation, the one-side element control by the second switching element is selected. As described above, if the one-side element control is performed, it is switched between the one-side element control by the first switching element and the one-side element control by the second switching element, as occasion demands.

During the one-side element control, the change amount of the output current that flows through the reactor in the first predetermined period is detected by the current value change amount detecting device. The "first predetermined period" herein is a period for detecting the change amount of the output current as an appropriate parameter that can be used for determination described later (i.e. determination of whether or not the output current is near zero), and is set in advance, for example, according to a sampling period of the output current or the like.

If the change amount of the output current is detected, it is determined by the determining device whether or not the output current is near zero. Specifically, the determining device determines that the output current is near zero if the change amount of the output current is less than the predetermined threshold value. In other words, the determining device determines that the output current is not near zero if the change amount of the output current is greater than or equal to the predetermined threshold value. The expression "near zero" herein indicates that the output current is so close to zero that the relation between the output current and the duty ratio described later changes. Moreover, the "predetermined value" is a threshold value set to determine whether or not the output current is near zero, and is typically set as a value that is close to zero.

A determination result of the determining device is used for the control of each switching element by the controlling device. Specifically, if it is not determined that the output current is near zero, the first duty control by the first control parameter is performed. On the other hand, if it is determined that the output current is near zero, the second duty control by the second control parameter, which is different from the first control parameter, is performed. The "duty control" herein is control for changing a duty ratio of the first switching element or the second switching element (i.e. a ratio between an ON period and an OFF period), and the controlling device controls the duty ratio according to the value of the output current to be outputted. The "control parameter" may be the duty ratio itself, or another parameter that indirectly influences the duty ratio.

The first duty control and the second duty control are performed by using the control parameters that are different from each other, and thus have different duty ratios corresponding to the output current (i.e. different duty ratios for obtaining the desired output current). Specifically, the duty ratio corresponding to the output current in the second duty control is set to be greater than the duty ratio corresponding to the output current in the first duty control. Thus, the duty ratio that is realized when an output current A is to be outputted by the second duty control is greater than the duty ratio that is realized when the output current A is to be outputted by the first duty control.

The relation between the output current and the duty ratio indicates such a tendency that the duty ratio increases as the output current decreases. Here, for example, if the first control parameter is set as a parameter that increases the duty ratio in a linear function manner with respect to a reduction in the output current, the second control parameter is set as a parameter that increases the duty ratio in a quadratic function manner with respect to the reduction in the output current.

Particularly in embodiments of the present invention, each of the first control parameter and the second control parameter includes the feed-forward term. The feed-forward term included in the first control parameter is set to be different from the feed-forward term included in the second control parameter. As described above, by providing the first and second control parameters with the different feed-forward terms, the duty ratio corresponding to the output current in the second duty control is set to be greater than the duty ratio corresponding to the output current in the first duty control. In other words, the respective feed-forward terms included in the first control parameter and the second control parameter are set to determine a magnitude relation between the duty ratio in the first duty control and the duty ratio in the second duty control.

As described above, in the boost control apparatus according to embodiments of the present invention, a different duty control is performed depending on whether or not the output current is near zero. In this manner, it is possible to respond to the change in the relation between the output current and the duty ratio, wherein the change occurs if the output current becomes near zero. For example, if the relation between the output current and the duty ratio changes, even though the duty ratio is the same, different output currents are outputted when the output current is near zero (hereinafter referred to as "zero crossing" as occasion demands) and when the output current is not near zero (hereinafter referred to as "non-zero crossing" as occasion demands). Thus, if the same duty control as that during a non-zero crossing is performed during zero crossing, the output current possibly does not have a desired value. In contrast, if the different duty control is performed depending on whether or not the output current is near zero, appropriate output current can be obtained both during zero crossing and during non-zero crossing.

Moreover, in embodiments of the present invention, as described above, it is determined whether or not it is zero crossing, by using the change amount of the output current in the first predetermined period. Thus, the zero crossing can be quickly and accurately determined, for example, in comparison with a case where the zero crossing is determined directly from an output value of a current sensor. It is thus possible to switch the duty control according to the zero crossing at appropriate timing, thereby certainly obtaining the desired output current.

As explained above, according to the boost control apparatus in the present invention, the zero crossing can be accurately determined during the one-side element control, and the appropriate duty control can be thus performed.

In one aspect of the boost control apparatus according to embodiments of the present invention, the current value change amount detecting device includes a differentiator.

According to this aspect, a slope of the output current can be obtained as the output of the differentiator, and thus, the change amount of the output current in the first predetermined period can be easily detected. Moreover, the use of an analog differentiator does not require, for example, the use of a high-performance micro computer that realizes digital processing, and cost can be thus reduced. Moreover, application is easily made to a conventional apparatus because an increase in control load, which shortens the sampling period of the output current, does not occur.

In another aspect of the boost control apparatus according to embodiments of the present invention, said current value change amount detecting device continuously detects the output current a predetermined number of times, thereby detecting the change amount.

According to this aspect, the change amount of the output current can be detected from a difference in the output current continuously detected at relatively short intervals (e.g. at intervals of 1 μs). The "predetermined number of times" herein is a value set to calculate an appropriate change amount, and is not particularly limited if it is twice or more. If the predetermined number of times is set to be three times or more, a plurality of change amounts can be detected from three or more detection values, or one change amount can be also detected from selected two values. The predetermined number of times may be changed according to circumstances.

In the aspect in which the output current is continuously detected the predetermined number of times, wherein the current value change amount detecting device continuously detects the output current three times or more, thereby detecting the change amount, and the determining device determines that the output current is near zero, if a predetermined number of change amounts or more out of a plurality of change amounts are less than the predetermined threshold value.

In this case, the plurality of change amounts of the output current are detected by the current value change amount detecting device. Specifically, from the three or more detected values of the output current, the change amounts of the output current in two or more different periods are detected. Then, on the determining device, it is determined that the output current is near zero if the predetermined number of change amounts or more out of the detected plurality of change amounts are less than the predetermined threshold value. In other words, if there are less than the predetermined number of change amounts that are less than the predetermined threshold value, it is not determined that the output current is near zero even though there is another change amount that is less than the predetermined threshold value.

The "predetermined number" is a value set to increase determination accuracy of the determining device, and in principle, the determination accuracy can be increased by increasing the value. Thus, if the number of the detected change amounts matches the predetermined number (i.e. if there is such a condition that all the detected change amounts are less than the predetermined threshold value), the zero crossing determination can be extremely accurately performed. On the other hand, if the predetermined number is set to be less than the number of the detected change amounts, the zero crossing determination can be preferably performed, for example, even if a part of the change amounts cannot be accurately detected due to noise or the like.

As described above, the use of the plurality of change amounts provides accurate determination in comparison with a case where it is determined whether or not the output current is near zero by using only one change amount. From the view point of increasing the accuracy, the use of more change amounts is preferable; however, in order to quickly perform the determination, the number of the change amounts is preferably not too many.

In another aspect of the boost control apparatus according to embodiments of the present invention, the current value change amount detecting device detects the change amount in a second predetermined period, which is immediately before the first switching element or the second switching element is turned on.

According to this aspect, the process for detecting the change amount of the output current and the determination process using the change amount of the output current are not necessarily performed all the time. It is thus possible to reduce a load except when the processes are actually performed, thereby reducing a load of the apparatus seen as a whole.

The output current increases in a period in which the first switching element or the second switching element is turned on, and decreases in a period in which the first or second switching element is turned off. Thus, theoretically, the output current is not near zero in the period in which the first switching element or the second switching element is turned on, and the output current is possibly near zero in the period in which the first or second switching element is turned off (or specifically, a period immediately before the first or second switching element is turned on). The "second predetermined period" in this aspect is a period set in advance as the aforementioned period in which the output current is possibly near zero.

As a result, if the change amount of the current is detected in the second predetermined period immediately before the first switching element or the second switching element is turned on, the zero crossing can be appropriately determined in the period in which the output current is possibly near zero. As a result, it is possible to avoid that an unnecessary process is performed, thereby efficiently reducing the control load.

In another aspect of the boost control apparatus according to embodiments of the present invention, the current value change amount detecting device respectively detects a first change amount, which is the change amount corresponding to a first period, and a second change amount, which is the change amount corresponding to a second period, in the first period and the second period that are continuous on a time axis, and the determining device (i) determines that timing corresponding to the second period is timing at which the output current becomes near zero if the first change amount is not less than the predetermined threshold value and the second change amount is less than the predetermined threshold value, and (ii) determines that timing corresponding to the second period is timing at which the output current is no longer near zero if the first change amount is less than the predetermined threshold value and the second change amount is not less than the predetermined threshold value.

In this case, by using the first change amount corresponding to the first period and the second change amount corresponding to the second period, it is possible to determine not only whether or not the output current is near zero, but also the timing at which the output current becomes near zero, or the timing at which the output current is no longer near zero.

Specifically, if the first change amount is not less than the predetermined threshold value and the second change amount is less than the predetermined threshold value, it can be determined that the output current is not near zero in the first period, but is near zero in the second period. Thus, it can be determined that the timing corresponding to the second period is the timing at which the output current becomes near zero. On the other hand, if the first change amount is less than the predetermined threshold value and the second change amount is not less than the predetermined threshold value, it can be determined that the output current is near zero in the first period, but is not near zero in the second period. Thus, it can be determined that the timing corresponding to the second period is the timing at which the output current is no longer near zero.

If the timing at which the output current becomes near zero, or the timing at which the output current is no longer near zero can be determined, it is possible not only to switch between the first duty control and the second duty control at appropriate timing, but also to appropriately perform a process to be performed only upon control switching (i.e. a process of increasing the continuity of the control parameter described later, a process of switching between gains in feedback control, etc.).

In another aspect of the boost control apparatus according to embodiments of the present invention, the controlling device performs control for increasing continuity of the first control parameter and the second control parameter when switching between the first duty control and the second duty control.

According to this aspect, it is possible to prevent that low continuity of the first control parameter and the second control parameter causing a disadvantage when switching between the first duty control and the second duty. A process performed as the control for increasing the continuity is not particularly limited. For example, a process of adjusting a value used for feedback control or feed-forward control is exemplified. It is also preferable to increase the continuity as much as possible (i.e. the first control parameter and the second control parameter have extremely close values upon switching); however, the aforementioned effect can be properly obtained if the continuity is increased to some extent.

If the timing at which the output current becomes near zero, or the timing at which the output current is no longer near zero can be determined as described above, the control for increasing the continuity according to this aspect may be performed in accordance with the determined timing.

In the aspect in which the control for increasing the continuity of the first parameter and the second parameter is performed, wherein the first duty control and the second duty control include proportional integral control, and said controlling device adds a difference between the first control parameter and the second control parameter to an integral term in the proportional integral control, thereby increasing the continuity of the first control parameter and the second control parameter.

In this case, the difference between the first control parameter and the second control parameter upon control switching is added to the integral term in the proportional integral control. A value added to the integral term may be the difference itself, or may be a value obtained by performing some operation processing on the difference, such as multiplying the difference by a predetermined coefficient. This increases the continuity of the first control parameter and the second control parameter, and thus the disadvantage that occurs upon control switching can be preferably avoided.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Hereinafter, embodiments according to the present invention will be explained with reference to the drawings.

<Entire Configuration>

Figure 1:
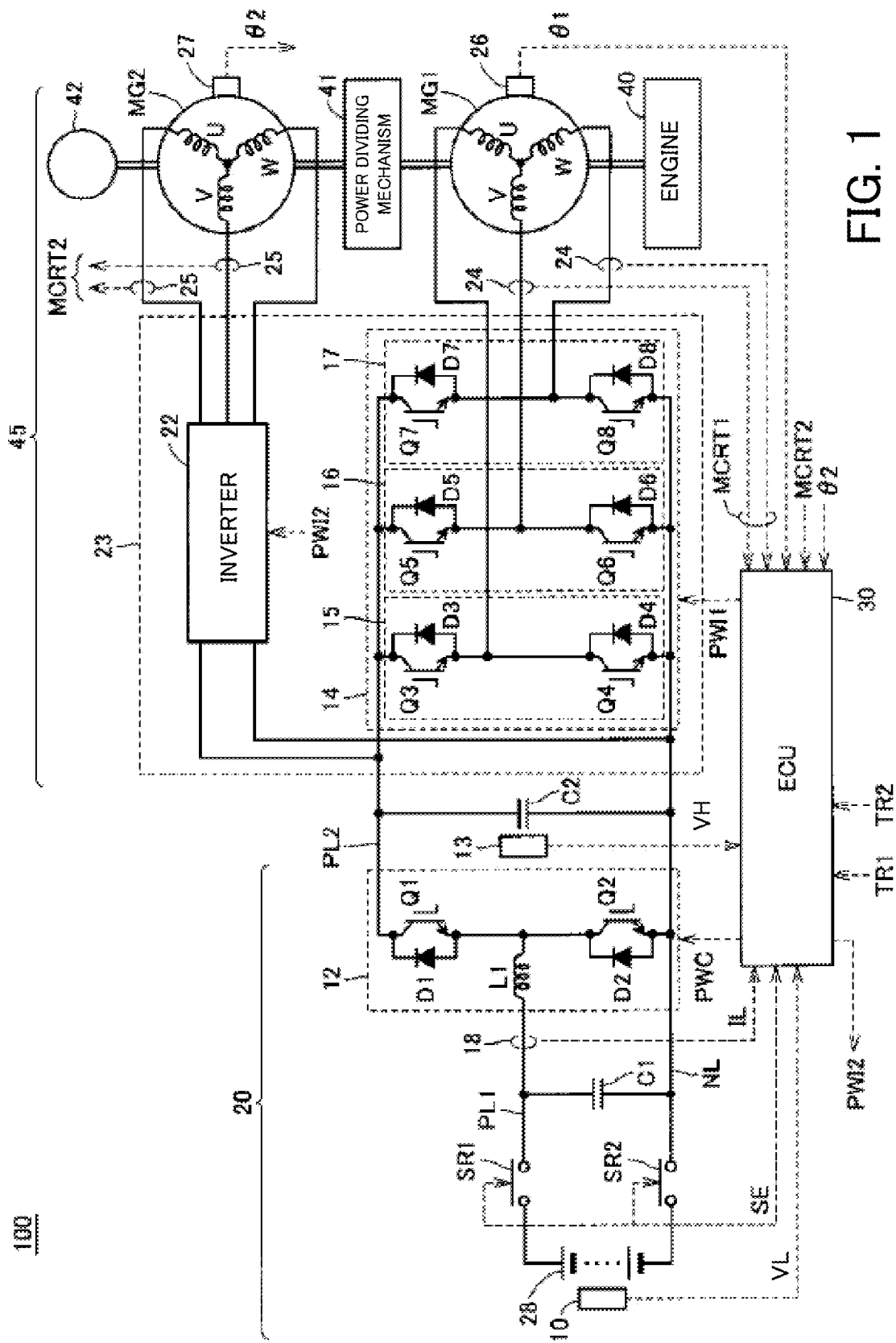
FIG. 1 is a schematic block diagram illustrating an entire configuration of a vehicle on which a boost control apparatus according to an embodiment is mounted.

Firstly, an explanation will be given to an entire configuration of a vehicle on which a boost control apparatus according to an embodiment is mounted, with reference to FIG. 1. FIG. 1 is a schematic block diagram illustrating the entire configuration of the vehicle on which the boost control apparatus according to the embodiment is mounted.

In FIG. 1, a vehicle 100 on which the boost control apparatus according to the embodiment is mounted is configured as a hybrid vehicle that uses an engine 40 and motor generators MG1 and MG2 as a power source. The configuration of the vehicle 100, however, is not limited to this example, and application can be also made to a vehicle that can run with electric power from a power storage apparatus (e.g. an electric car and a fuel-cell car) or the like. Moreover, the embodiment explains the configuration that the boost control apparatus is mounted on the vehicle 100; however, application can be also made to any device that is driven by an alternating current (AC) motor, even except for the vehicle.

The vehicle 100 is provided mainly with a direct current (DC) voltage generation unit 20, a loading apparatus 45, a smoothing capacitor C2, and an ECU 30.

The DC voltage generation unit 20 includes a power storage apparatus 28, system relays SR1 and SR2, a smoothing capacitor C1, and a converter 12.

The power storage apparatus 28 includes a secondary battery, such as, for example, a nickel hydrogen or lithium ion secondary battery, and a power storage apparatus, such as an electric double layer capacitor. Moreover, DC voltage VL outputted by the power storage apparatus 28 is detected by a voltage sensor 10. The voltage sensor 10 outputs a detection value of the DC voltage VL detected, to the ECU 30.

The system relay SR1 is connected between a positive terminal of the power storage apparatus 28 and a power line PL1, and the system relay SR2 is connected between a negative terminal of the power storage apparatus 28 and a grounding wire NL. The system relays SR1 and SR2 are controlled by a signal SE from the ECU 30, and switch between supply and cutoff of electric power from the power storage apparatus 28 to the converter 12.

The converter 12 includes a reactor L1, switching elements Q1 and Q2, and diodes D1 and D2. The switching elements Q1 and Q2 are respectively one example of the "first switching element" and the "second switching element" according to the present invention, and are connected in series between a power line PL2 and the grounding wire NL. The switching elements Q1 and Q2 are controlled by a gate signal PWC from the ECU 30.

For the switching elements Q1 and Q2, for example, an insulated gate bipolar transistor (IGBT), a power metal-oxide semiconductor (MOS) transistor, a power bipolar transistor, or the like can be used. For the switching elements Q1 and Q2, reverse parallel diodes D1 and D2 are respectively disposed. The reactor L1 is provided between a connection node of the switching elements Q1 and Q2 and the power line PL1. Moreover, the smoothing capacitor C2 is connected between the power line PL2 and the grounding wire NL.

The current sensor 18 detects reactor current that flows through the reactor L1, and outputs its detection value IL to the ECU 30. The reactor current IL is one example of the "output current" according to an embodiment of the present invention.

The loading apparatus 45 includes an inverter 23, the motor generators MG1 and MG2, the engine 40, a power dividing mechanism 41, and a drive wheel 42. Moreover, the inverter 23 includes an inverter 14 for driving the motor generator MG1 and an inverter 22 for driving the motor generator MG2. The provision of two pairs of the inverters and the motor generators as illustrated in FIG. 1 is not necessary. For example, either a pair of the inverter 14 and the motor generator MG1, or a pair of the inverter 22 and the motor generator MG2 may be provided.

The motor generators MG1 and MG2 generate rotational driving force for vehicle propulsion in response to AC power supplied from the inverter 23. Moreover, the motor generators MG1 and MG2 receive turning force from the exterior, generate AC power in response to a regenerative torque command from the ECU 30, and generate regenerative braking force on the vehicle 100.

Moreover, the motor generators MG1 and MG2 are also coupled with the engine 40 via the power dividing mechanism 41. Then, driving force generated by the engine 40 and the driving force generated by the motor generators MG1 and MG2 are controlled to have an optimal ratio. Moreover, one of the motor generators MG1 and MG2 may be allowed to function only as an electric motor, and the other motor generator may be allowed to function only as a generator. In the embodiment, the motor generator MG1 is allowed to function as a generator driven by the engine 40, and the motor generator MG2 is allowed to function as an electric motor that drives the drive wheel 42.

For the power dividing mechanism 41, for example, a planetary gear is used to divide the power of the engine 40 into the drive wheel 42 and the motor generator MG1.

The inverter 14 drives the motor generator MG1, for example, in order to start the engine 40, in response to boosted voltage from the converter 12. Moreover, the inverter 14 outputs, to the converter 12, regenerative power generated by the motor generator MG1 by using mechanical power transmitted from the engine 40. At this time, the converter 12 is controlled by the ECU 30 to operate as a voltage lowering circuit.

The inverter 14 is provided in parallel between the power line PL2 and the grounding wire NL, and includes U-phase upper and lower arms 15, V-phase upper and lower arms 16, and W-phase upper and lower arms 17. Each-phase upper and lower arms are provided with switching elements that are connected in series between the power line PL2 and the grounding wire NL. For example, the U-phase upper and lower arms 15 are provided with switching elements Q3 and Q4. The V-phase upper and lower arms 16 are provided with switching elements Q5 and Q6. The W-phase upper and lower arms 17 are provided with switching elements Q7 and Q8. Moreover, reverse parallel diodes D3 to D8 are respectively connected to the switching element Q3 to Q8. The switching element Q3 to Q8 are controlled by a gate signal PWI from the ECU 30.

For example, the motor generator MG1 is a three-phase permanent magnet type synchronous motor, and respective one ends of three coils in U, V, and W phases are commonly connected to a neutral point. The other ends of respective phase coils are respectively connected to connection nodes of the switching elements of respective phase upper and lower arms 15 to 17.

The inverter 22 is connected in parallel with the inverter 14, with respect to the converter 12.

The inverter 22 converts DC voltage outputted by the converter 12 to three-phase alternating current and outputs it to the motor generator MG2 that drives the drive wheel 42. The inverter 22 outputs regenerative power generated by the motor generator MG2 to the converter 12 in association with regenerative braking. At this time, the converter 12 is controlled by the ECU 30 to operate as a voltage lowering circuit. An inner configuration of the inverter 22 is not illustrated but is the same as that of the inverter 14, and thus, a detailed explanation will be omitted.

The converter 12 is basically controlled in such a manner that the switching elements Q1 and Q2 are complementarily and alternately turned on and off within each switching period. The converter 12 boosts the DC voltage VL supplied from the power storage apparatus 28, to DC voltage VH, during a voltage boosting operation (wherein this DC voltage corresponding to input voltage inputted to inverter 14 is also referred to as "system voltage" hereinafter). The voltage boosting operation is performed by supplying electromagnetic energy stored in the reactor L1 in an ON period of the switching Q2, to the power line PL2 via the switching element Q1 and the reverse parallel diode D1.

Moreover, the converter 12 lowers the DC voltage VH to the DC voltage VL during a voltage lowering operation. The voltage lowering operation is performed by supplying electromagnetic energy stored in the reactor L1 in an ON period of the switching Q1, to the grounding wire NL via the switching element Q2 and the reverse parallel diode D2.

A voltage conversion ratio (or a ratio between VH and VL) in the voltage boosting operation and the voltage lowering operation is controlled by an ON period ratio (or a duty ratio) between the switching elements Q1 and Q2 in the switching period described above. If the switching elements Q1 and Q2 are respectively fixed to ON and OFF, VH=VL (voltage conversion ratio=1.0) can be also set.

The smoothing capacitor C2 smoothes the DC voltage from the converter, and supplies the smoothed DC voltage to the inverter 23. A voltage sensor 13 detects voltage between both ends of the smoothing capacitor C2, i.e. the system voltage VH, and outputs its detection value to the ECU 30.

If a torque command value of the motor generator MG1 is positive (TR1>0), the inverter 14 drives the motor generator MG1 to convert DC voltage to AC voltage and to output positive torque by a switching operation of the switching elements Q3 to Q8 that responds to a gate signal PWI1 from the ECU 30, when the DC voltage is supplied from the smoothing capacitor C2. Moreover, if the torque command value of the motor generator MG1 is zero (TR1=0), the inverter 14 drives the motor generator MG1 to convert DC voltage to AC voltage and to allow zero torque by the switching operation that responds to the gate signal PWI1. By this, the motor generator MG1 is driven to generate the zero or positive torque designated by the torque command value TR1.

Moreover, during the regenerative braking of the vehicle 100, the torque command value TR1 of the motor generator MG1 is set to be negative (TR1<0). In this case, the inverter 14 converts AC voltage generated by the motor generator MG1 to DC voltage by the switching operation that responds to the gate signal PWI1, and supplies the converted DC voltage (or system voltage) to the converter 12 via the smoothing capacitor C2. The regenerative braking herein includes braking with power regeneration when a foot brake operation is performed by a driver that drives an electric vehicle, and reducing the vehicle (or stopping acceleration) while performing the power regeneration by stepping off an accelerator pedal during running even though the foot brake operation is not performed.

In the same manner, the inverter 22 drives the motor generator MG2 to convert DC voltage to AC voltage and to allow predetermined torque by a switching operation that responds to a gate signal PWI2 received from the ECU 30 corresponding to a torque command value of the motor generator MG2.

Current sensors 24 and 25 respectively detect motor currents MCRT1 and MCRT2, which respectively flow through the motor generators MG1 and MG2, and output the detected motor currents to the ECU 30. Since the sum of instantaneous values of currents in the U, V, and W-phases is zero, it is sufficient to dispose the current sensors 24 and 25 so as to detect the motor currents in two phases, as illustrated in FIG. 1.

Rotation angle sensors (or resolvers) 26 and 27 respectively detect rotation angles $\theta1$ and $\theta2$ of the motor generators MG1 and MG2, and transmit the detected rotation angles $\theta1$ and $\theta2$ to the ECU 30. On the ECU 30, rotational speeds MRN1 and MRN2 and angular velocities $\omega1$ and $\omega2$ (rad/s) of the motor generators MG1 and MG2 can be calculated on the basis of the rotation angles $\theta1$ and $\theta2$. The rotation angle sensors 26 and 27 may not be provided if the rotation angles $\theta1$ and $\theta2$ are directly operated or calculated from motor voltage and current on the ECU 30.

The ECU 30 is one example of the "boost control apparatus" according to an embodiment of the present invention, includes, for example, a central processing unit (CPU), a storage apparatus or a memory, and an input/output buffer, and controls each device of the vehicle 100. The control performed by the ECU 30 is not limited to a process by software, but can be also established and processed by exclusive hardware (or electronic circuit). A specific configuration and operation of the ECU will be detailed later.

<One-Side Element Control>

Figure 2:
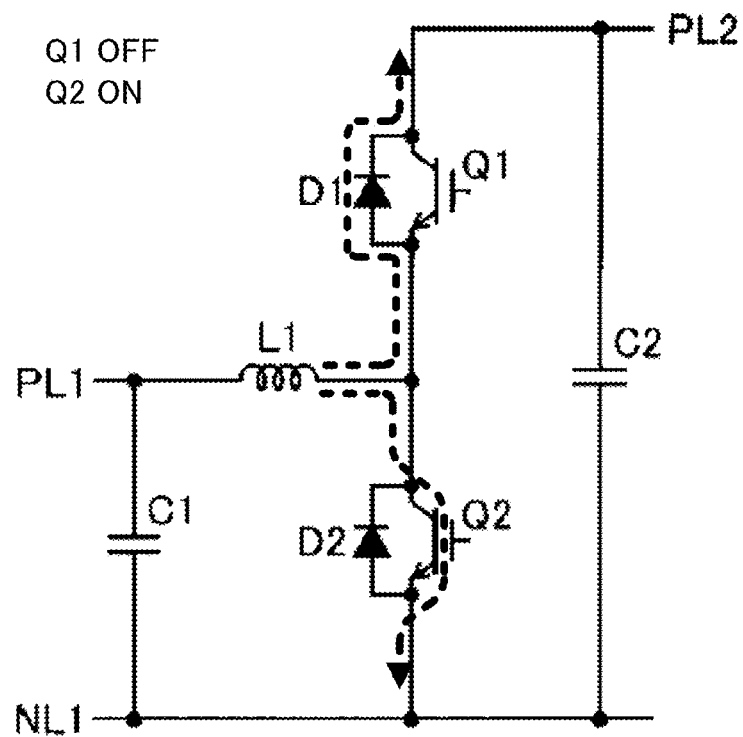
FIG. 2 is a conceptual diagram illustrating a current flow during lower-side element control.
Figure 3:
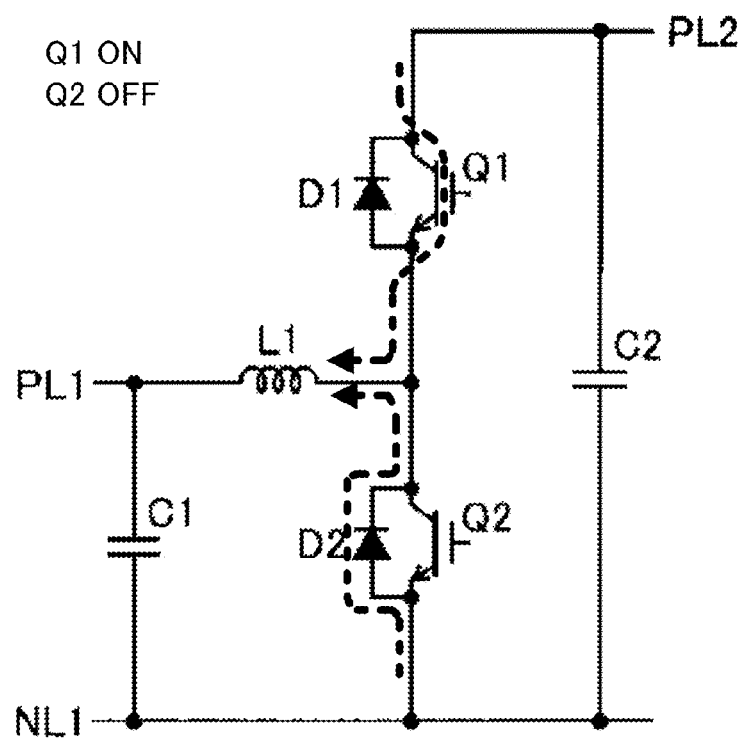
FIG. 3 is a conceptual diagram illustrating a current flow during upper-side element control.
Figure 4:
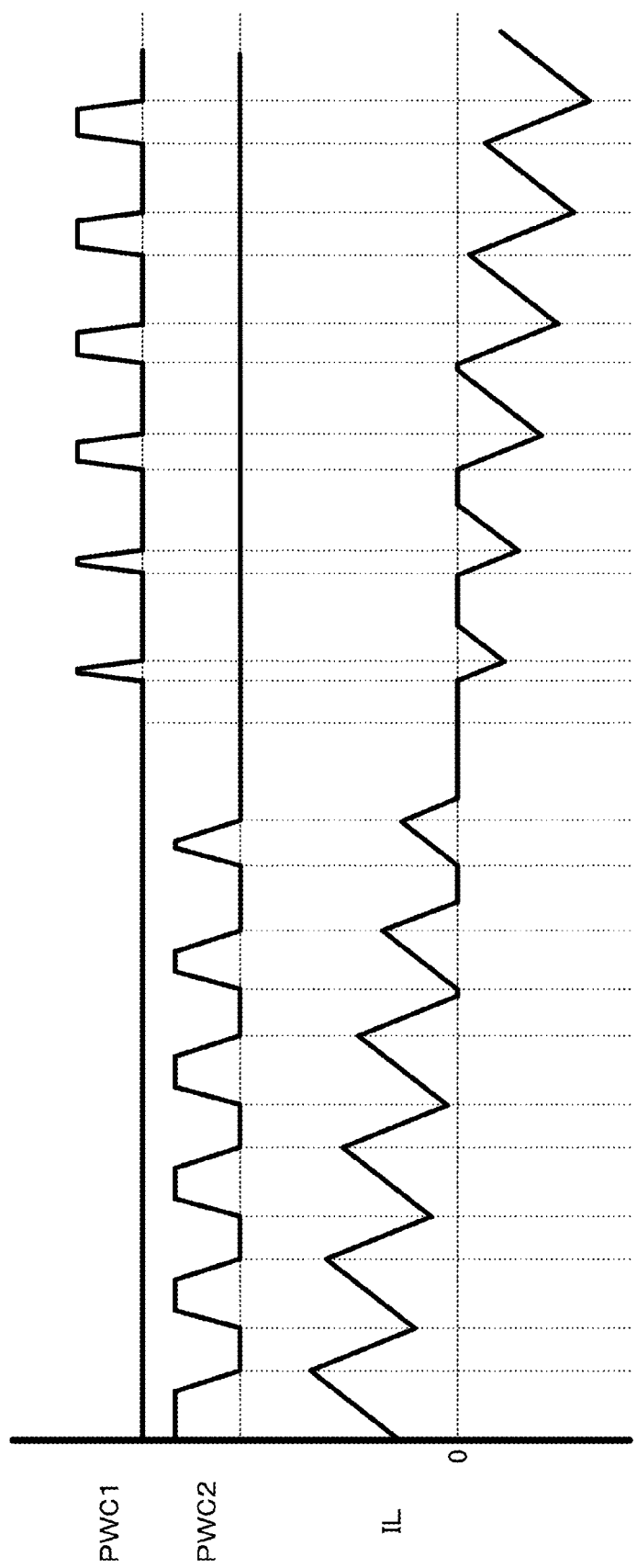
FIG. 4 is a time chart illustrating a variation in reactor current during one-side element control.

Next, one-side element control of the converter 12 will be explained with reference to FIG. 2 to FIG. 4. FIG. 2 is a conceptual diagram illustrating a current flow during lower-side element control. FIG. 3 is a conceptual diagram illustrating a current flow during upper-side element control. FIG. 4 is a time chart illustrating a variation in reactor current during one-side element control.

In FIG. 2 and FIG. 3, the converter 12 according to the embodiment can realize the one-side element control of turning on only one of the switching elements Q1 and Q2, in addition to normal control (i.e. control of turning on both the switching elements Q1 and Q2). Specifically, during power running, lower-side element control of turning on only the switching element Q2 is performed. In this case, as illustrated in FIG. 2, current that flows on the switching element Q1 side flows through the diode D1, and current that flows on the switching element Q2 side flows through the switching element Q2. On the other hand, during regeneration, upper-side element control of turning on only the switching element Q1 is performed. In this case, as illustrated in FIG. 3, current that flows on the switching element Q1 side flows through the switching element Q1, and current that flows on the switching element Q2 side flows through the diode D2.

According to the one-side element control, since either one of the switching elements Q1 and Q2 is turned on, a dead time, which is set to prevent a short-circuit in the switching elements Q1 and Q2, is not required. Thus, for example, even if high frequency is required in association with miniaturization of an apparatus, it is possible to prevent a reduction in boosting performance of the converter 12. Moreover, the one-side element control can also avoid gate interference of the switching elements and reduce a boosting loss.

As illustrated in FIG. 4, in the one-side element control, the value of the reactor current IL is controlled by selectively supplying either one of PWC1, which is a gate signal for switching between ON and OFF of the switching element Q1, and PWC2, which is a gate signal for switching between ON and OFF of the switching element Q2.

Specifically, during power running in which the lower-side element control is performed (i.e. if the reactor current IL is positive), the PWC1, which is the gate signal for switching between ON and OFF of the switching element Q1, is not supplied, and only the PWC2, which is the gate signal for switching between ON and OFF of the switching element Q2, is supplied. Moreover, during regeneration in which the upper-side element control is performed (i.e. if the reactor current IL is negative), only the PWC1, which is the gate signal for switching between ON and OFF of the switching element Q1, is supplied, and the PWC2, which is the gate signal for switching between ON and OFF of the switching element Q2, is not supplied.

<Configuration of ECU>

Figure 5:
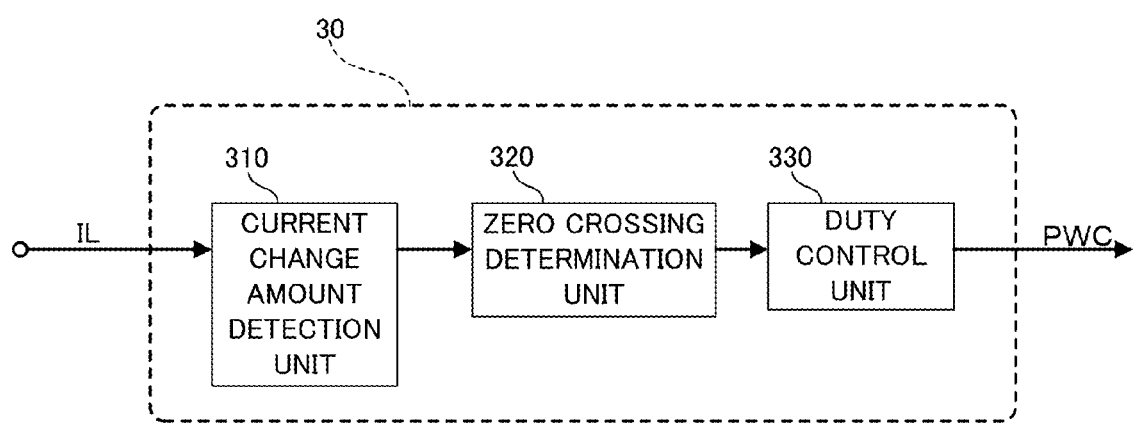
FIG. 5 is a block diagram illustrating a specific configuration of an ECU according to the embodiment.

Next, a specific configuration of the ECU 30, which is one example of the boost control apparatus according to the embodiment, will be explained with reference to FIG. 5. FIG. 5 is a block diagram illustrating the specific configuration of the ECU according to the embodiment. In FIG. 5, for convenience of explanation, out of parts of the ECU 30, only a part that is deeply related to the embodiment is illustrated, and the illustration of the other detailed parts is omitted as occasion demands.

In FIG. 5, the ECU 30 according to the embodiment is provided with a current change amount detection unit 310, a zero crossing determination unit 320, and a duty control unit 330.

The current change amount detection unit 310 is one example of the "current value change amount detecting device" according to an embodiment of the present invention, and detects a change amount of the reactor current IL (in other words, a slope of the reactor current IL) detected by the current sensor 18. The current change amount detection unit 310 detects, for example, a difference in the reactor current IL between two continuous points, as the change amount. The current change amount detection unit 310 may be also configured as a differentiator. The change amount of the reactor current IL detected by the current change amount detection unit 310 is configured to be outputted to the zero crossing determination unit 320.

The zero crossing determination unit 320 is one example of the "determining device" according to an embodiment of the present invention, and determines whether or not it is zero crossing (i.e. whether or not the reactor current IL is near zero) on the basis of the change amount of the reactor current IL detected by the current change amount detection unit 310. The zero crossing determination unit 320 stores therein, for example, a threshold value for the change amount of the reactor current IL, and compares the change amount of the reactor current IL with the threshold value, thereby determining the zero crossing. A determination result of the zero crossing determination unit 320 is configured to be outputted to the duty control unit 330.

The duty control unit 330 is one example of the "controlling device" according to an embodiment of the present invention, and outputs a gate signal PWC, thereby controlling each of the ON and OFF of the switching elements Q1 and Q2. The duty control unit 330 includes, for example, a duty signal generation circuit configured to generate a duty command signal DUTY and a carrier signal generation circuit configured to generate a carrier signal CR. The duty control unit 330 compares the duty command signal DUTY generated according to a desired duty ratio, with the carrier signal CR, and outputs the gate signal PWC, which is obtained as a comparison result, to each of the switching elements Q1 and Q2.

<Method of Detecting Reactor Current>

Figure 6:
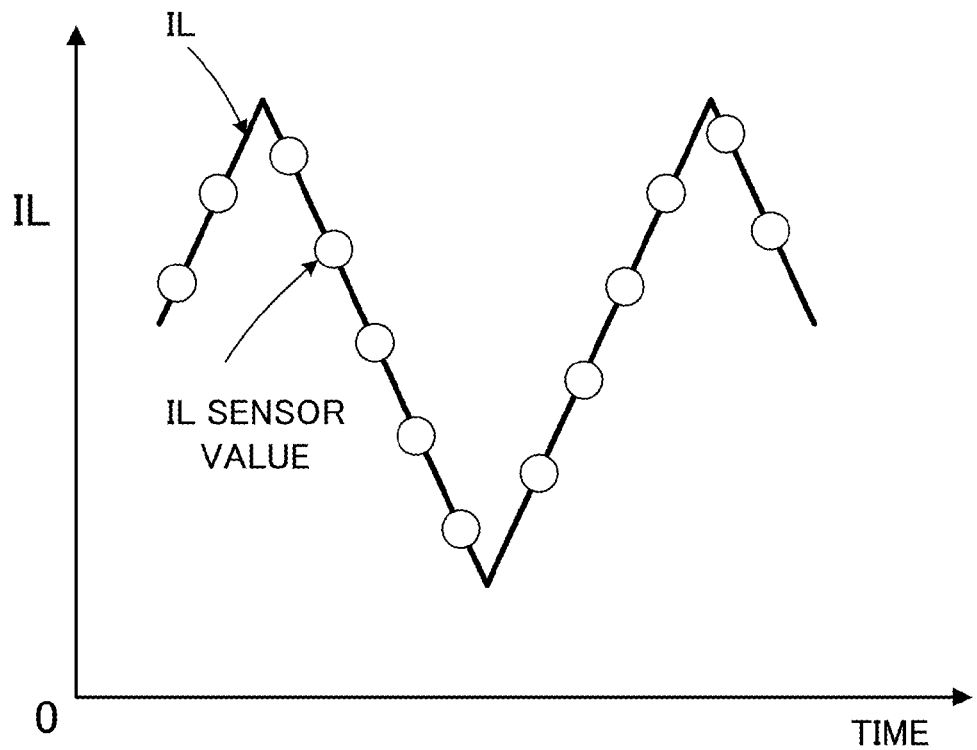
FIG. 6 is a graph (ver. 1) illustrating a method of detecting the reactor current according to the embodiment.
Figure 7:
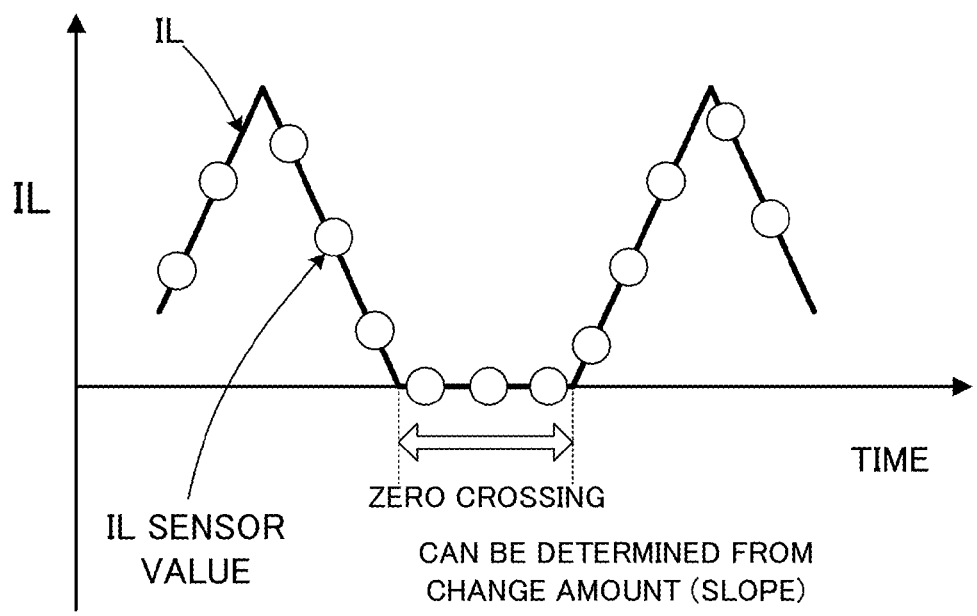
FIG. 7 is a graph (ver. 2) illustrating the method of detecting the reactor current according to the embodiment.
Figure 8:
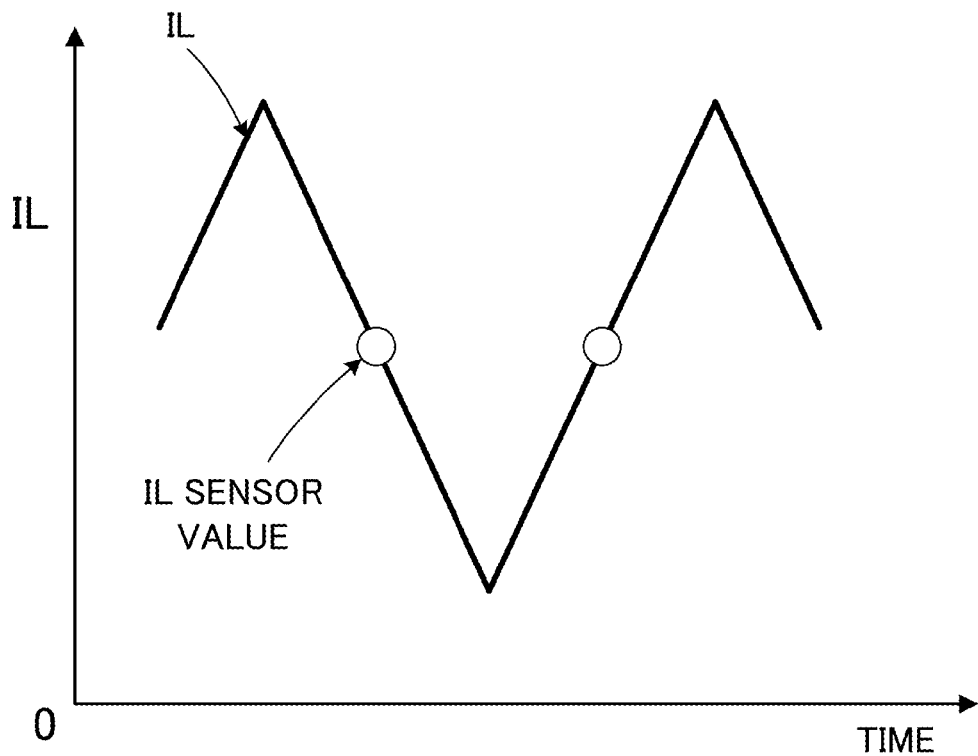
FIG. 8 is a graph (ver. 1) illustrating a method of detecting the reactor current according to a comparative example.
Figure 9:
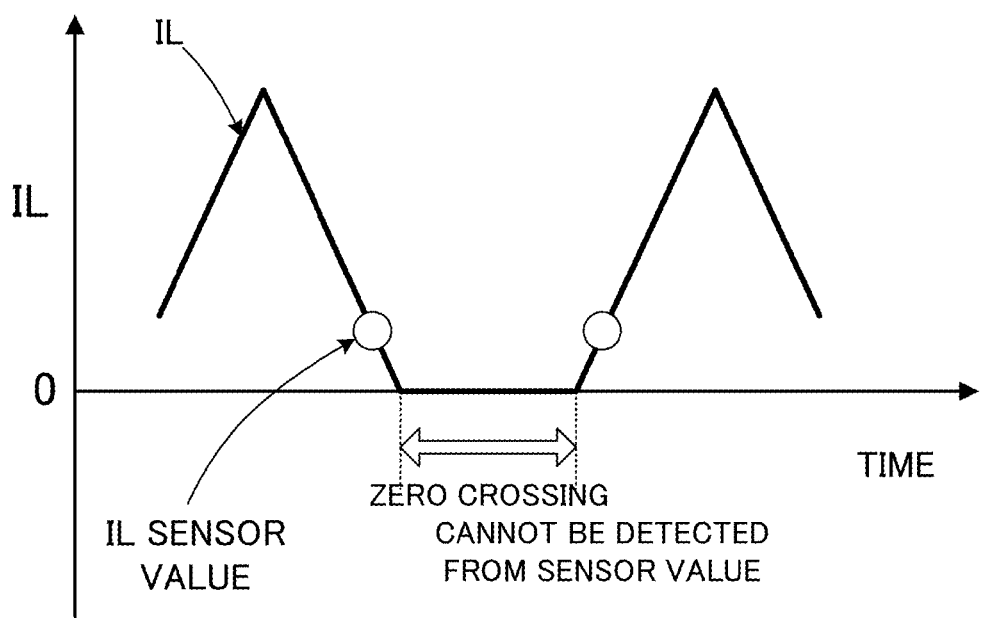
FIG. 9 is a graph (ver. 2) illustrating the method of detecting the reactor current according to the comparative example.
Figure 10:
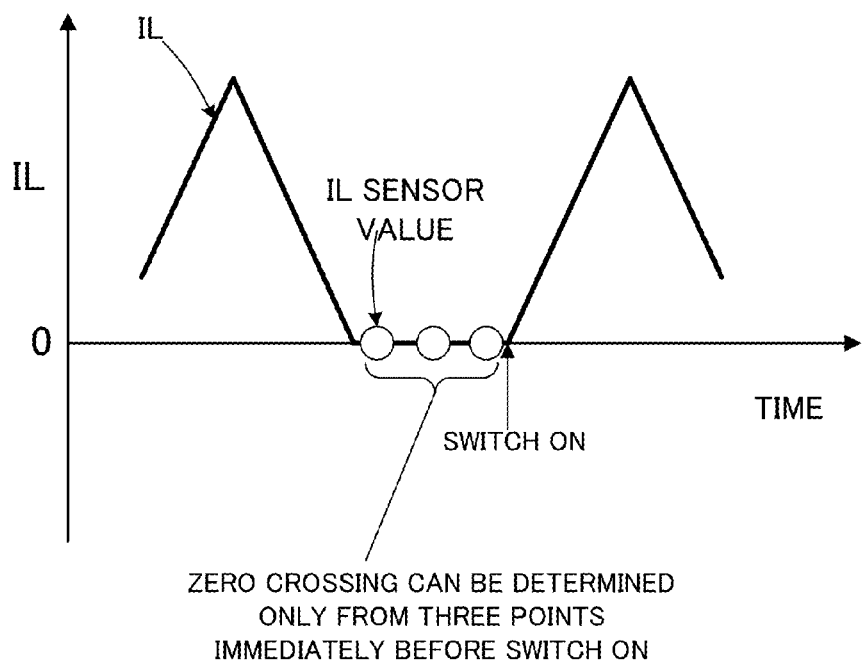
FIG. 10 is a graph illustrating a method of detecting the reactor current according to a first modified example.
Figure 11:
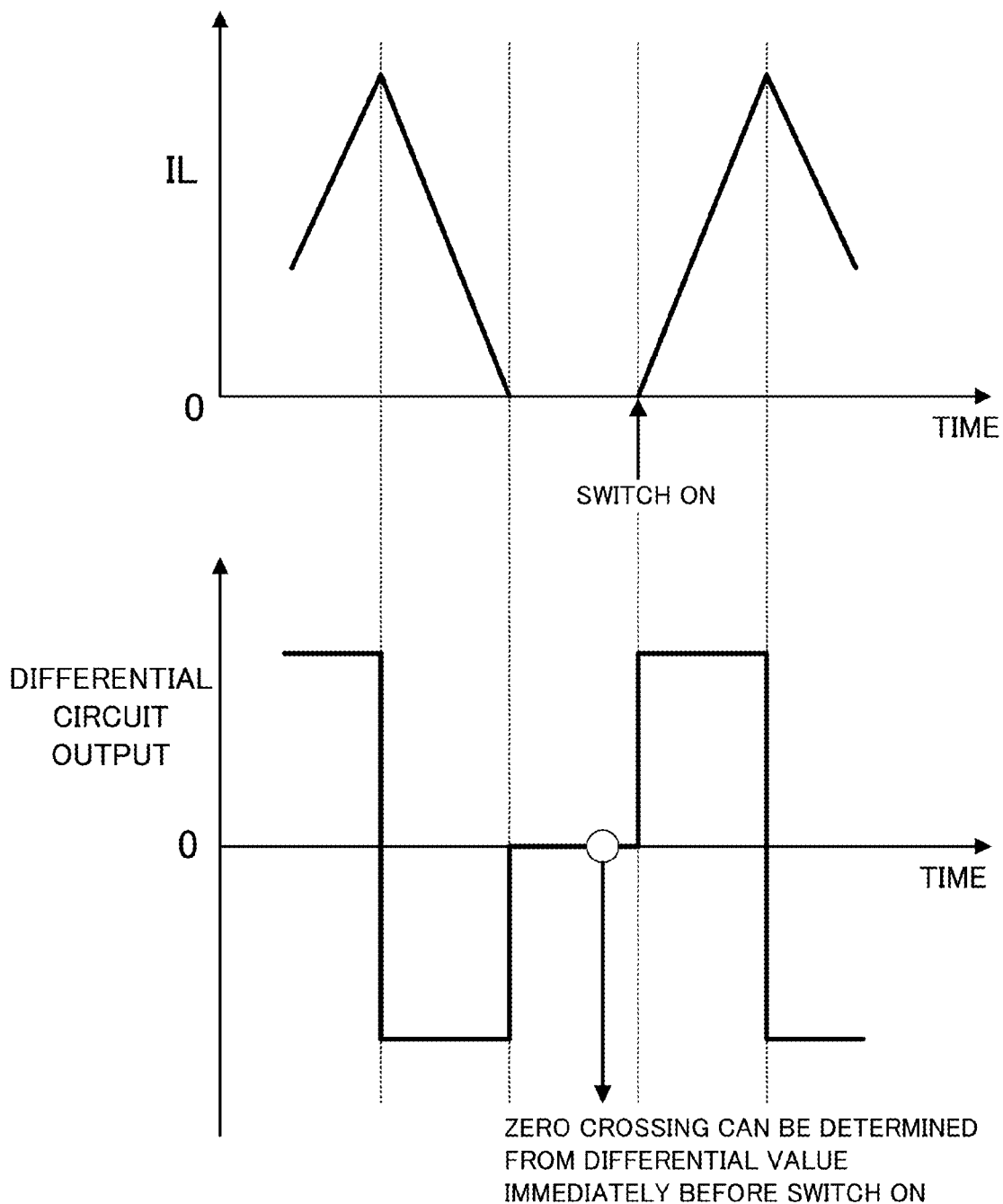
FIG. 11 is a graph illustrating a method of detecting a change amount of the reactor current according to the first modified example.

Next, a method of detecting the reactor current IL will be explained in detail with reference to FIG. 6 to FIG. 11. Each of FIG. 6 and FIG. 7 is a graph illustrating a method of detecting the reactor current according to the embodiment. Each of FIG. 8 and FIG. 9 is a graph illustrating a method of detecting the reactor current according to a comparative example. FIG. 10 is a graph illustrating a method of detecting the reactor current according to a first modified example. FIG. 11 is a graph illustrating a method of detecting the change amount of the reactor current according to the first modified example.

As illustrated in FIG. 6, on the boost control apparatus according to the embodiment, the reactor current IL is sampled at many points at intervals of a predetermined period (e.g. at intervals of 1 µs) by the current sensor 18 (refer to FIG. 1). The predetermined period, which is a detection period of the reactor current IL, may be appropriately set according to the switching period of the switching elements Q1 and Q2 (in other words, a period in which the reactor current IL goes up and down).

As illustrated in FIG. 7, if the reactor current IL is sampled at many points, the same value is continuously detected during a zero crossing. Thus, the zero crossing can be appropriately determined from the change amount of the reactor current IL. Specifically, the zero crossing can be determined based on the condition that the change amount of the reactor current IL is less than a predetermined value (more specifically, is a value extremely close to zero).

As illustrated in FIG. 8, the comparative example in which the reactor current IL is sampled only in the center of a ripple is considered. Even in such a comparative example, the value of the reactor current IL can be detected at some accuracy during a non-zero crossing. However, unlike the embodiment described above, it is hard to appropriately determine the zero crossing.

As illustrated in FIG. 9, there is a period in which the reactor current IL is constant during zero crossing. In the comparative example in which the reactor current IL is sampled only in the center of the ripple, however, there can be such a situation that the reactor current IL is not detected at all in the zero crossing period. It is therefore hard to determine the zero crossing from the change amount of the reactor current IL, unlike in the embodiment described above.

As illustrated in FIG. 10, according to the embodiment, the sampling may be performed on the boost control apparatus only in a period immediately before the switching element Q1 or Q2 is turned on. In other words, it is not necessary to detect the reactor current IL all the time.

The reactor current IL increases in a period in which the switching elements Q1 and Q2 are turned on, and decreases in a period in which the switching elements Q1 and Q2 are turned off. Thus, theoretically, the reactor current IL is not close to zero in the period in which the switching elements Q1 and Q2 are turned on, and is possibly close to zero in the period in which the switching elements Q1 and Q2 are turned off (or specially the period immediately before the switching elements Q1 and Q2 are turned on).

Therefore, if the change amount of the reactor current IL is detected in the period immediately before the switching elements Q1 and Q2 are turned on (here, a period 3 µs before three points are detected by 1 µs-interval detection), it is then possible to appropriately determine the zero crossing in the period in which the reactor current IL is possibly near zero. As a result, it is possible to avoid an unnecessary detection process and an unnecessary determination process, thereby efficiently reducing a control load.

As illustrated in FIG. 11, if a differential circuit is used, output thereof can be used without change as the change amount of the reactor current IL. Moreover, if an analog differential circuit is used, there is no need to use, for example, a high-performance micro computer that realizes a digital process. Thus, cost can be reduced. Furthermore, an increase in the control load that allows a short sampling period of the reactor current IL does not occur, and it is thus easily applied to a conventional apparatus.

<Problem that can Occur During Zero Crossing>

Figure 12:
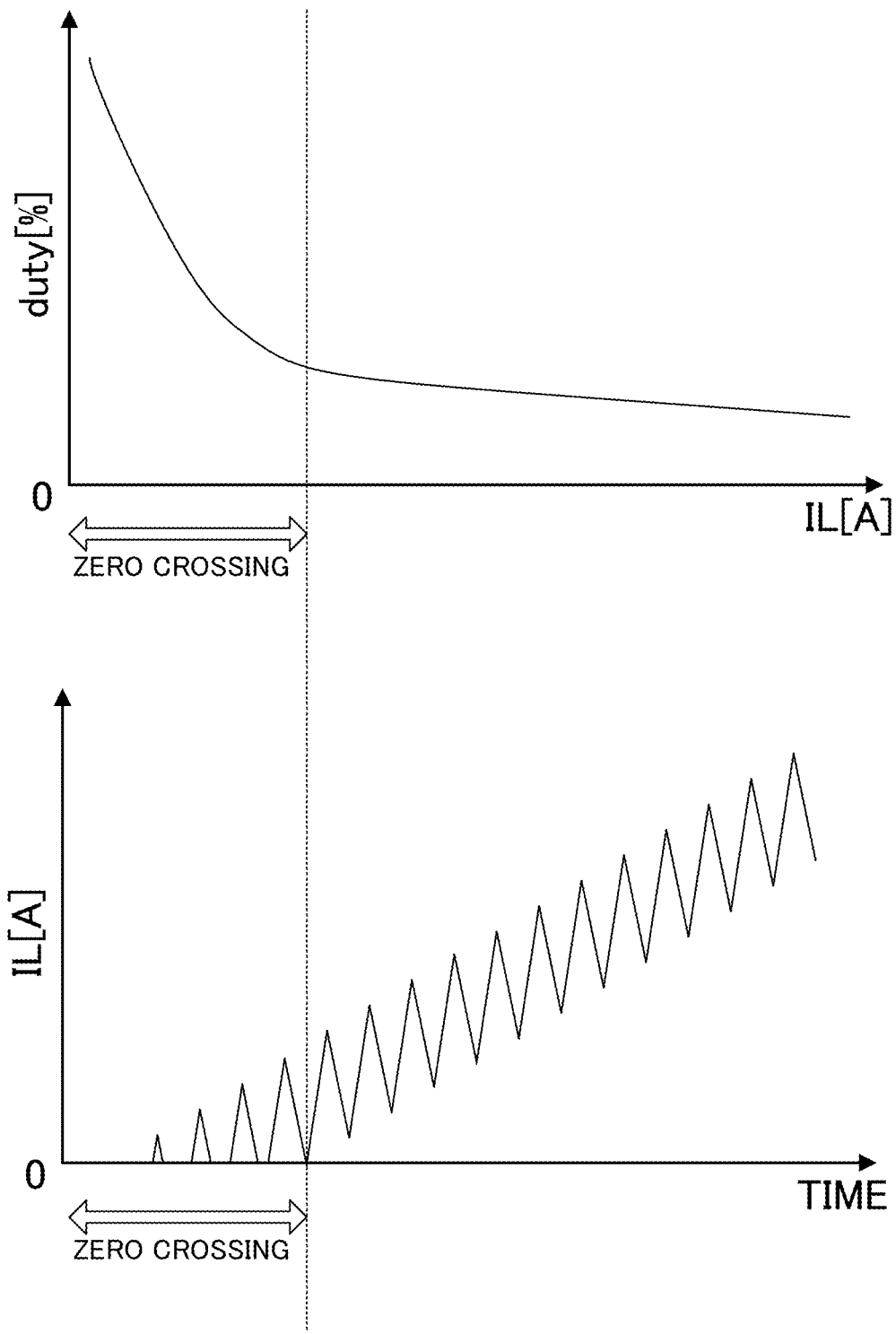
FIG. 12 is a graph illustrating a relation between duty and the reactor current during zero crossing.
Figure 13:
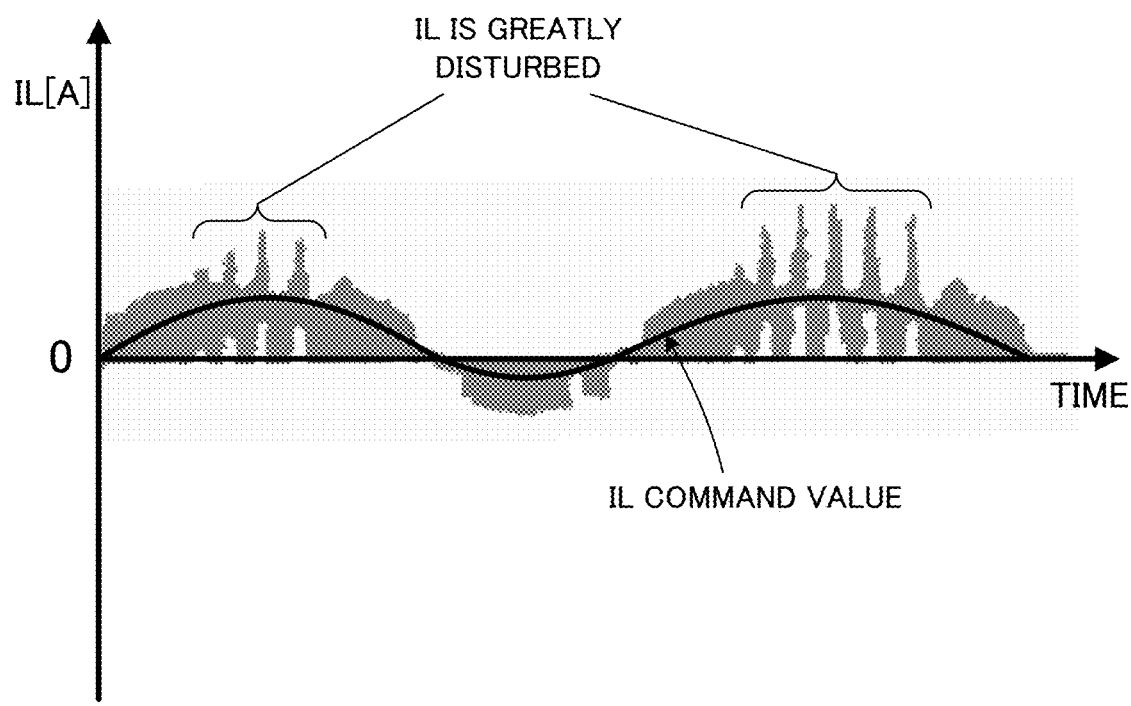
FIG. 13 is a graph illustrating a simulation result of the reactor current according to the comparative example.
Figure 14:
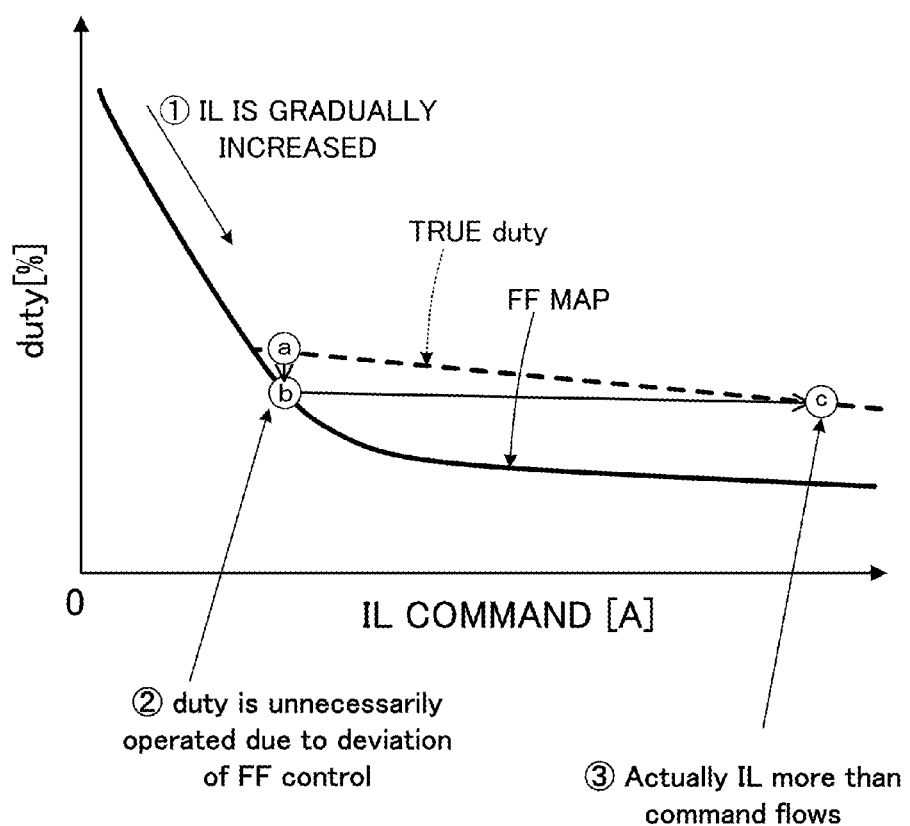
FIG. 14 is a graph illustrating a problem caused by deviation of feed-forward control.

Next, a problem that can occur when the reactor current IL is near zero will be explained with reference to FIG. 12 to FIG. 14. FIG. 12 is a graph illustrating a relation between duty and the reactor current during zero crossing. FIG. 13 is a graph illustrating a simulation result of the reactor current according to the comparative example. FIG. 14 is a graph illustrating a problem caused by deviation of feed-forward control.

As illustrated in FIG. 12, during non-zero crossing, the relation between the duty and the reactor current IL is linear. During zero crossing, however, the reactor current IL cannot change across zero, and the relation between the duty and the reactor current IL is thus not linear. As described above, the relation between the duty and the reactor current IL significantly changes depending on whether or not the reactor current IL is near zero.

As illustrated in FIG. 13, if the same control is performed during zero crossing and during non-zero crossing, the actual reactor current IL is greatly disturbed with respect to a command value of the reactor current IL. In other words, if the control is performed without considering whether or not the reactor current IL is near zero, there can be such a problem that a desired reactor current IL cannot be obtained.

If feed-forward control and feedback control are performed when the duty is controlled, there is a possibility that the aforementioned disadvantage can be avoided. However, the feed-forward control uses easily variable parameters such as, for example, inductance of the reactor L1 and internal resistance of the power storage apparatus 28, deviation highly likely occurs. Therefore, even the use of the feed-forward control and the feedback control does not necessarily provide the desired reactor current IL all the time.

As illustrated in FIG. 14, it is assumed that control at a point a is currently desired in a situation in which the reactor current IL is gradually increased. If, however, there is deviation of the feed-forward control, control at a point b is performed. In other words, control is performed in such a manner that the duty is smaller than an appropriate value. In this case, it is regarded as control at a point c corresponding to true duty, and the reactor current IL to be outputted is an extremely high. As described above, if the reactor current IL is outputted as an unnecessarily large value, for example, there can be damage in a PCU or the like. In other words, if the desired reactor current IL is not obtained, there is a possibility of an unexpected disadvantage.

The boost control apparatus according to the embodiment is configured to perform a duty control switching operation explained below, in order to avoid the aforementioned disadvantage.

<Duty Control Switching Operation>

Figure 15:
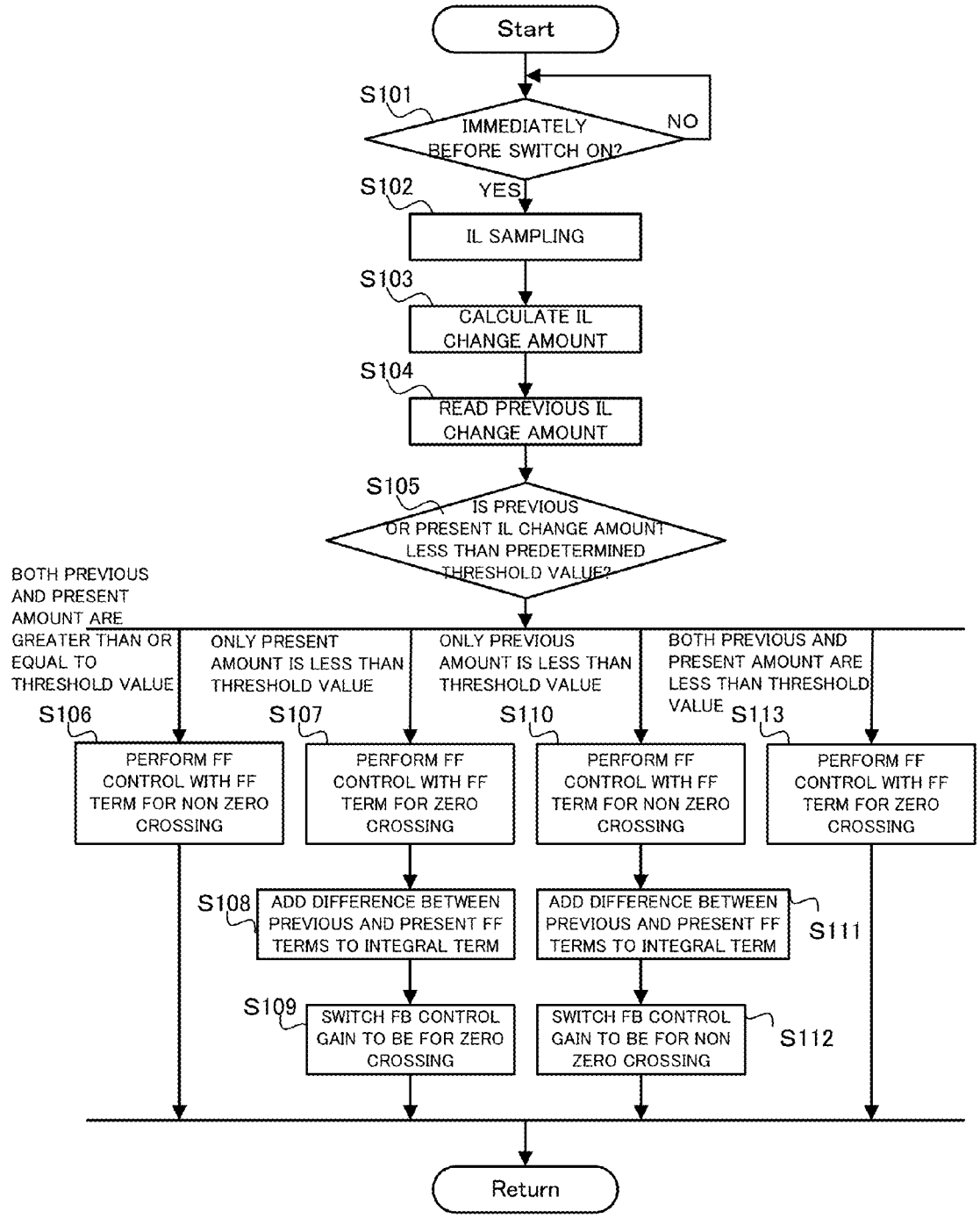
FIG. 15 is a flowchart illustrating a duty control switching operation according to the embodiment.
Figure 16:
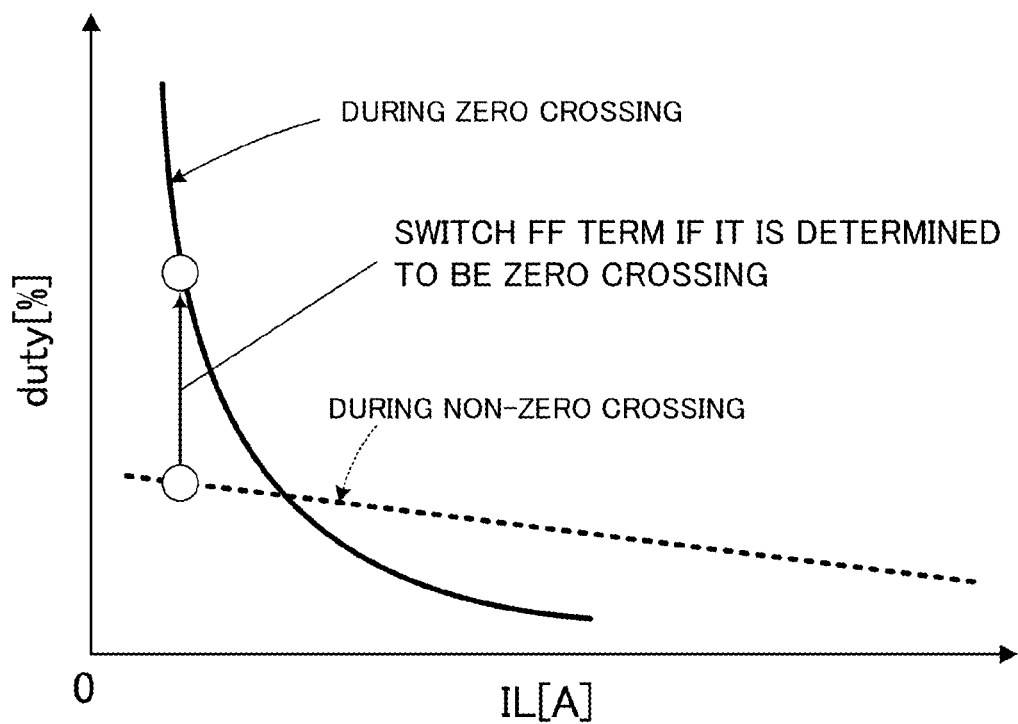
FIG. 16 is a graph illustrating a feed-forward term switching operation.
Figure 17:
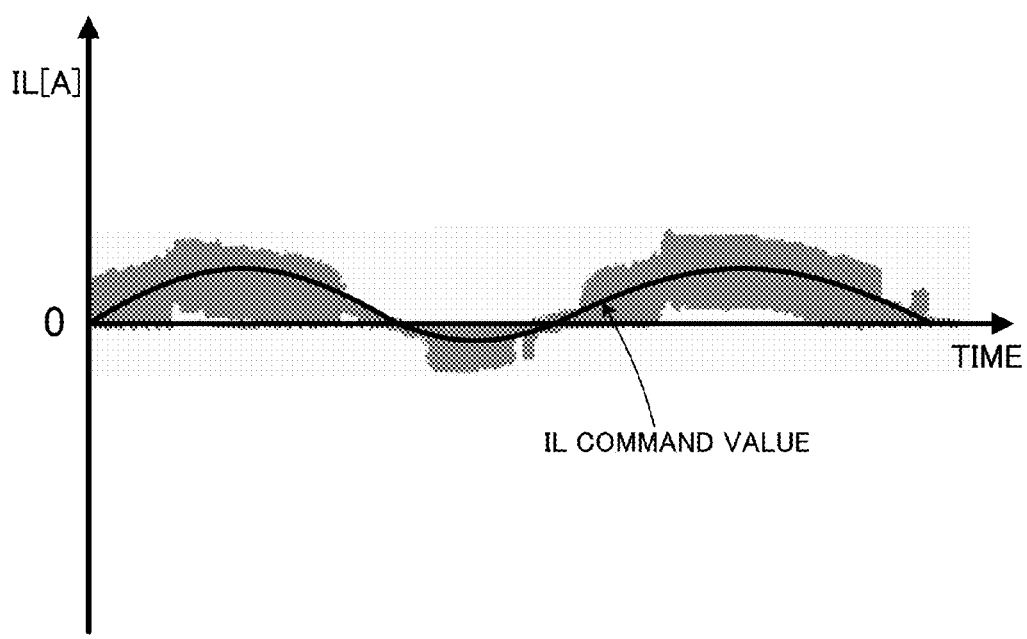
FIG. 17 is a graph illustrating a simulation result of the reactor current according to the embodiment.

Hereinafter, a duty control switching operation performed by the ECU 30, which is one example of the boost control apparatus according to the embodiment, will be explained in detail with reference to FIG. 15 to FIG. 17. FIG. 15 is a flowchart illustrating the duty control switching operation according to the embodiment. FIG. 16 is a graph illustrating a feed-forward term switching operation. FIG. 17 is a graph illustrating a simulation result of the reactor current according to the embodiment.

In FIG. 15, in the duty control switching operation, it is firstly determined whether or not it is a period immediately before the switching element Q1 or Q2 is turned ON (step S101). In other words, as explained in FIG. 10, it is determined whether or not it is a period in which the reactor current IL is to be sampled. If it is determined that it is the period immediately before the switching element Q1 or Q2 is turned ON (the step S101: YES), the reactor current IL is sampled by the current sensor 18 (step S102). The current sensor 18 samples the reactor current IL at predetermined intervals (e.g. 1 μs) until the switching element Q1 or Q2 is turned on. The sampled reactor current IL is inputted to the current change amount detection unit 310 of the ECU 30, and the change amount of the reactor current IL is detected (step S103).

The change amount of the reactor current IL is inputted to the zero crossing determination unit 320. On the zero crossing determination unit 320, if the change amount of the reactor current IL is inputted, the change amount of the reactor current IL used for previous determination is read from a memory or the like (step S104). At this time point, the zero crossing determination unit 320 has the change amount of the reactor current IL detected for present determination and the change amount of the reactor current IL detected for previous determination.

Then, on the zero crossing determination unit 320, it is determined whether or not each of the present change amount of the reactor current IL and the previous change amount of the reactor current IL is less than a predetermined threshold value (step S105). Here, the predetermined threshold value is a threshold value for determining the zero crossing, and is stored in advance in the memory or the like of the zero crossing determination unit 320. The zero crossing determination unit 320 determines that it is the zero crossing if the change amount of the reactor current IL is less than the predetermined threshold value, and determines that it is not the zero crossing (i.e. non-zero crossing) if the change amount of the reactor current IL is not less than the predetermined threshold value. Determination results are separately and respectively provided for the present change amount of the reactor current IL and the previous change amount of the reactor current IL.

If it is determined that both the present change amount of the reactor current IL and the previous change amount of the reactor current IL are greater than or equal to the predetermined threshold value, the zero crossing determination unit 320 determines that a non-zero crossing state continues from the previous time. As a result, on the duty control unit 330, duty control for non-zero crossing is continued. Specifically, the duty control unit 330 performs the feed-forward control using a feed-forward term (hereinafter referred to as a "FF term" as occasion demands) for non-zero crossing (step S106). A specific duty command in this case is expressed by the following equation (1).

$$\text{Duty command} = FF \text{ term during non-zero crossing} + kp1 \times \text{Current deviation} + ki1 \times \text{Current deviation} + \text{Integral term} \quad (1)$$

Each of kp1 and ki1 is a feedback gain during non-zero crossing, and for example, kp1=0.01, and ki1=0.1. Moreover, "ki1×Current deviation+Integral term" herein is an integral term in next control.

If it is determined that only the present change amount of the reactor current IL is less than the predetermined threshold value and that the previous change amount of the reactor current IL is greater than and equal to the predetermined threshold value, the zero crossing determination unit 320 determines that it was in the non-zero crossing state until the previous time but it is in a zero crossing state from this time. As a result, on the duty control unit 330, the duty control for non-zero crossing is switched to duty control for zero crossing. Specifically, the duty control unit 330 performs the feed-forward control using a FF term for zero crossing (step S107). Moreover, on the duty control unit 330, a difference between the previous FF term (i.e. the FF term for non-zero crossing) and the present FF term (i.e. the FF term for zero crossing) is calculated and is added to the integral term of the duty command (step S108). Moreover, on the duty control unit 330, the feedback gain is switched to a feedback gain for zero crossing (step S109). A specific duty command in this case is expressed by the following equation (2).

$$\text{Duty command} = FF \text{ term during zero crossing} + kp2 \times \text{Current deviation} + ki2 \times \text{Current deviation} + \{\text{Integral term} + (FF \text{ term during non-zero crossing} - FF \text{ term for zero crossing})\} \quad (2)$$

Each of kp2 and ki2 is the feedback gain during zero crossing, and for example, kp2=0.03, and ki2=0.3. Moreover, "ki1×Current deviation+Integral term" herein is an integral term in next control. Moreover, "ki2×Current deviation+{Integral term+(FF term during non-zero crossing−FF term for zero crossing)}" herein is the integral term in next control.

In FIG. 16, as already explained, if it is determined that the non-zero crossing is switched to the zero-crossing, the FF term is switched from the FF term for non-zero crossing to the FF term for zero crossing. As is clear from FIG. 16, the relation between the reactor current IL and the duty ratio during non-zero crossing is that the duty ratio increases in a linear function manner with respect to a reduction in the reactor current IL. On the other hand, the relation between the reactor current IL and the duty ratio during zero crossing is that the duty ratio increases in a quadratic function manner with respect to a reduction in the reactor current IL. When the reactor current IL is near zero, the duty ratio corresponding to the reactor current IL for zero crossing is greater than that for non-zero crossing. Thus, if it is determined that it is switched to the zero-crossing from the non-zero crossing, the duty ratio corresponding to the reactor current IL is increased.

At this time, the continuity of the FF term is lost before and after the switching, and thus, simply switching the FF term possibly causes a disadvantage. Therefore, in the embodiment, as described above, the difference between the FF term for non-zero crossing and the FF term for zero crossing is added to the integral term, so that the continuity is kept before and after the switching. Moreover, due to the switching of the feedback gain (i.e. the switching from kp1 and ki1 to kp2 and ki2), it is also possible to respond to a change in responsiveness.

If it is determined that only the previous change amount of the reactor current IL is less than the predetermined threshold value and that the present change amount of the reactor current IL is greater than or equal to the predetermined threshold value, the zero crossing determination unit 320 determines that it was in the zero crossing state until the previous time but it is in the non-zero crossing state from this time. As a result, on the duty control unit 330, the duty control for zero crossing is switched to the duty control for non-zero crossing. Specifically, the duty control unit 330 performs the feed-forward control using the FF term for non-zero crossing (step S110). Moreover, on the duty control unit 330, a difference between the previous FF term (i.e. the FF term for zero crossing) and the present FF term (i.e. the FF term for non-zero crossing) is calculated and is added to the integral term of the duty command (step S111). Moreover, on the duty control unit 330, the feedback gain is switched to a feedback for non-zero crossing (step S112). A specific duty command in this case is expressed by the following equation (3).

Duty command=*FF* term during non-zero crossing+
  *kp*1×Current deviation+*ki*1×Current deviation+
  {Integral term+(*FF* term during zero crossing−
  *FF* term for non-zero crossing)}     (3)

"ki1×Current deviation+{Integral term+(FF term during zero crossing−FF term for non-zero crossing)}" herein is the integral term in next control.

If it is determined that both the present change amount of the reactor current IL and the previous change amount of the reactor current IL are less than the predetermined threshold value, the zero crossing determination unit 320 determines that the zero-crossing state continues from the previous time. As a result, on the duty control unit 330, the duty control for zero crossing is continued. Specifically, the duty control unit 330 performs the feed-forward control using the FF term for zero crossing (step S113). A specific duty command in this case is expressed by the following equation (4).

Duty command=*FF* term during zero crossing+*kp*2×
  Current deviation+*ki*2×Current deviation+Integral term     (4)

"ki2×Current deviation+Integral term" herein is the integral term in next control.

As illustrated in FIG. 17, according to the aforementioned duty control switching process, the disturbance of the reactor current IL as illustrated in FIG. 13 can be suppressed. In other words, a deviation between the command value of the reactor current IL and the actual reactor current IL can be reduced. To put it differently, if the different duty control is selectively performed according to whether or not it is the zero crossing, the desired reactor current IL can be certainly obtained even if the relation between the duty and the reactor current IL changes.

As explained above, according to the boost control apparatus in the embodiment, the zero crossing can be accurately determined, and the duty control can be preferably performed.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A boost control apparatus that can realize one-side element control for driving only either one of a first switching element and a second switching element, each of which is connected to a reactor in series, said boost control apparatus comprising:
   a current value change amount detecting device configured to detect a change amount of output current that flows through the reactor in a first predetermined period during the one-side element control;
   a determining device configured to determine that the output current is near zero if the change amount is less than a predetermined threshold value; and
   a controlling device configured (i) to perform first duty control by a first control parameter if it is not determined that the output current is near zero, and (ii) to perform a second duty control by a second control parameter, which is different from the first control parameter, if it is determined that the output current is near zero, wherein
   a duty ratio corresponding to the output current in a second duty control is set to be greater than a duty ratio in the first duty control,
   said current value change amount detecting device is to respectively detect a first change amount, which is the change amount corresponding to a first period, and a second change amount,
   which is the change amount corresponding to a second period, in the first period and the second period that are continuous on a time axis, and
   said determining device (i) is to determine that timing corresponding to the second period is that timing at which the output current becomes near zero if the first change amount is not less than the predetermined threshold value and the second change amount is less than the predetermined threshold value, and (ii) is to determine that timing corresponding to the second period is that timing at which the output current is no longer near zero if the first change amount is less than the predetermined threshold value and the second change amount is not less than the predetermined threshold value.

2. The boost control apparatus according to claim 1, wherein said current value change amount detecting device includes a differentiator.

3. The boost control apparatus according to claim 1, wherein said current value change amount detecting device continuously detects the output current a predetermined number of times, thereby detecting the change amount.

4. The boost control apparatus according to claim 3, wherein
   said current value change amount detecting device continuously detects the output current three times or more, thereby detecting the change amount.

5. The boost control apparatus according to claim 1, wherein said current value change amount detecting device detects the change amount in a second predetermined period, which is immediately before the first switching element or the second switching element is turned on.

6. The boost control apparatus according to claim 1, wherein said controlling device performs control for increasing continuity of the first control parameter and the second control parameter when switching between the first duty control and the second duty control.

7. The boost control apparatus according to claim 6, wherein
the first duty control and the second duty control include proportional integral control, and
said controlling device adds a difference between the first control parameter and the second control parameter to an integral term in the proportional integral control, thereby increasing the continuity of the first control parameter and the second control parameter.

* * * * *